United States Patent [19]

Yeakley

[11] 3,872,423

[45] Mar. 18, 1975

[54] VEHICLE PACER SYSTEM AND A METHOD OF SPACING MOVING VEHICLES ALONG A TRAFFIC LANE OF A ROADWAY

[75] Inventor: John Yeakley, Neptune, N.J.

[73] Assignee: American Enterprise of Charlotte, Inc., Neptune, N.J.

[22] Filed: June 27, 1973

[21] Appl. No.: 373,918

[52] U.S. Cl. ................................................ 340/43
[51] Int. Cl. ............................................. G08g 1/09
[58] Field of Search ......... 340/22, 31 R, 32, 33, 35, 340/36, 43

[56] References Cited
UNITED STATES PATENTS

| | | | |
|---|---|---|---|
| 2,407,432 | 9/1946 | Manewich | 340/43 |
| 2,457,968 | 1/1949 | Allen et al. | 340/22 |
| 2,683,868 | 7/1954 | McKnight | 340/43 |
| 3,094,682 | 6/1963 | Brosh et al. | 340/22 |
| 3,188,927 | 6/1965 | Woods | 340/31 R |
| 3,302,168 | 1/1967 | Gray et al. | 340/31 R |
| 3,368,201 | 2/1968 | Skrobisch | 340/22 |
| 3,529,284 | 9/1970 | Villemain | 340/35 |
| 3,544,959 | 12/1970 | Hawks | 340/43 |
| 3,593,262 | 7/1971 | Spencer | 340/36 |
| 3,614,727 | 10/1971 | Fritts | 340/22 |
| 3,693,143 | 9/1972 | Kennedy | 340/27 NA |
| 3,750,099 | 7/1973 | Proctor | 340/22 |
| 3,796,871 | 3/1974 | Helmcke et al. | 340/36 |

Primary Examiner—William C. Cooper
Assistant Examiner—Randall P. Myers
Attorney, Agent, or Firm—Kenyon & Kenyon Reilly Carr & Chapin

[57] ABSTRACT

In order to maintain successive vehicles in a traffic lane in spaced apart relation, a series of means are disposed along the traffic lane to display a pacing signal. Each of these means is adapted to selectively display a pacing signal or indicator which is timed with respect to the other means so as to provide a "continuous signal" corresponding to a vehicular speed of, for example, 60 miles per hour along the lane. By keeping pace with the signal as it appears from one means to the others along the series of means, a vehicle can be maintained at the programmed speed, while simultaneously being maintained at a substantially fixed distance from a vehicle in front and a vehicle in back. The signals are programmed for each means so as to space successive vehicles apart at a distance corresponding to the programmed speed for the vehicles and the time interval from one displayed pacing signal to the next.

17 Claims, 12 Drawing Figures

VEHICLE PACER SYSTEM AND A METHOD OF SPACING MOVING VEHICLES ALONG A TRAFFIC LANE OF A ROADWAY

This invention relates to a vehicle pacer system and a method of spacing moving vehicles along a traffic lane of a roadway.

As is known, one of the problems with high speed highways and roadways is the multiple vehicle accident. In general, it appears that such accidents occur because vehicles travel too closely together for existing road conditions. That is, should a forwardmost vehicle slow down or stop for any unexpected reason, the vehicles behind can become stacked up in a domino fashion which, if insufficient space remains between vehicles to avoid a rear-end collision, can cause a chain reaction multiple vehicle accident.

Another problem with these highways has been the occurance of "traffic clusters." In such clusters, one vehicle, sometimes a truck, travels a few miles per hour slower than the general traffic flow. This results in the following vehicles slowing up and being overtaken by other following vehicles until a cluster or knot of traffic exists. Not only do these clusters result in a substantially vacant roadway ahead, but they also create a potential for a multiple vehicle accident.

Accordingly, it is an object of this invention to reduce the possibility of chain reaction multiple vehicle accidents on high speed roadways.

It is another object of the invention to facilitate the spacing apart of vehicles on a roadway.

It is another object of the invention to provide a pacer system for the movement of vehicles which is of relatively inexpensive cost.

It is another object of the invention to be able to increase highway capacity when it is measured in vehicles per hour.

It is well known that various traffic signal systems have been utilized to control traffic patterns, especially on city streets. In some instances, traffic lights of various types have been installed along a major artery which are electronically controlled and synchronized so as to maintain a flow of traffic at certain speeds, for example, 25 miles per hour. In these cases, the so-called green lights have been sequentially timed so that a car travelling at the predetermined speed of 25 miles an hour would successively encounter only green lights during travel along the artery. However, a vehicle travelling at a greater speed would be forced to come to a stop at a red light at some point in the system as the green light at that point would not have been triggered. Similarly, a vehicle travelling at a speed less that the speed of 25 miles per hour would eventually reach a red light which had been green but which had now turned to red. One of the characteristics of such traffic systems is that clusters or groups of vehicles are controlled to move at substantially the same speeds. There is, however, no control of the spacing of the vehicles within these clusters. Furthermore, these traffic systems seem to allow a higher concentration of vehicles in the front of the clusters than at the tail ends. Also, the cost of these systems make it prohibitive for use in controlling the spacing between successive vehicles.

Briefly, the invention provides a simple vehicle pacer system for spacing immediately successive vehicles apart in a traffic lane of a roadway. The system includes a series of signal indicating means which are programmed to display a "continuous signal" from one to the other, corresponding to a predetermined vehicular speed. The signal indicating means are disposed along the traffic lane in equally spaced apart relationship to each other and each has at least two indicators for selective visual display with one of the indicators serving as a pacing signal. Each indicating means also has a receiver means for selecting one of the indicators for display in response to a first received signal and for selecting another of the indicators for display in response to an absence of a received signal. In addition, the vehicle pacer system includes a transmitter means for generating and transmitting a command signal which is remotely located with respect to the series of signal indicating means. The transmitter means serves to generate and emit the command signal to the receiver means of a signal indicating means repeatedly at predetermined time intervals and for relatively short time durations to obtain an alternating visual display of the respective indicators in each signal indicating means. The command signal is also emitted in chronological sequence to the receiver means of all the signal indicating means of the series to obtain a visual display of a pacing signal at each successive signal indicating means in a continuous sequence. This effects the appearance of a "continuous signal" which appears to move at a speed corresponding to a predetermined speed for a vehicle travelling along the traffic lane.

The system permits successive displays of continuous pacing signals to appear along the series of signal indicating means to enable successively travelling vehicles to be paced at the same speed. In addition, because of the time interval between consecutively displayed pacing signals at each individual indicating means, the successive vehicles become spaced apart at equal distances from each other. This spacing is substantially equal to the product of the vehicle speed in feet per second times the time interval of the pacing signal.

In one embodiment, each signal indicating means utilizes two elements for displaying two different indicators. One element is used to display the pacing indicator or signal while the other is used to display some other indicator or signal. For example, each element is made of an hour-glass shaped segment which is of a color different from the other, e.g., one red, the other yellow. Also, one element is mounted in a stationary fashion while the other is movably mounted so as to be moved from one position in alignment with the first element to a second position out of alignment of the first element. In the first position, the second element masks the first element so that only the second element can be seen, i.e., only the red element. In the second position, both elements can be seen, i.e., the red and yellow elements.

In use, a command signal is directed to an individual signal indicating means so that the first element (red) is moved over the second element (yellow) to mask the second element. In this way, only the shape and color of the first element will appear. By programming successive indicating means chronologically, only the red elements will appear as a vehicle passes each indicating means while travelling at a programmed speed for example, 60 miles per hour. Should the vehicle travel at a faster speed, the vehicle would come to an indicating means which had not yet been actuated to show only the red element but would instead show both the red and yellow elements. This would indicate a need to the drive of the vehicle for slowing down in order to again become synchronized with the continuous pacing signal. The duration of the signal for displaying the red elements alone are of short duration so that the red signal disappears rather rapidly to discourage a following vehicle from attempting to keep pace with the same continuous signal as the vehicle intended.

In another embodiment, similar signal indicating means as above can be used. However, in this embodiment, alternating signal indicating means are programmed to display a first indicator, such as the red element while the other indicating means are programmed to display the second indicator, that is, the red and yellow elements. The timing of the various indicators are such that two successive vehicles can be paced with one following only the red elements displayed by successive indicating means while the second vehicle follows only the red and yellow indicators of the successive indicating means.

In still another embodiment, the signal indicating means has two indicators which are selected for visual display such that one indicator is displayed in response to a first command signal, the other indicator is displayed in response to a second command signal and both are displayed in the absence of either command signal. For example, use is made of a masking means, such as a nematic liquid crystal material which becomes opaque upon electrical excitation for masking one or both of the indicators from view. To this end, each signal indicating means is composed of two indicators which are geometrically spaced apart in a common vertical plane and which are made of different colors. The indicators are each in the form of two quadrant-shaped segments disposed in symmetrical opposition to each other. In addition, a pair of transparent sheets, e.g. glass or plastic are disposed in front of and coincident with the indicators while a thin film layer of nematic crystal material is sandwiched between the two sheets. In order to activate the nematic crystal liquid material, a transparent electrical conductor is disposed in the sheet remote from the indicators to act as a common ground while separate transparent electrical conductors are disposed in the sheet closest to the indicators, each of which conductors is oriented in coincidence with only one of the indicators. For example, where the indicators are formed of quadrant-shaped segments, four separate electrical conductors are used with each in coincidence with only one quadrant-shaped segment. In addition, a signal generator is electrically connected to the electrical conductors in the plastic sheet closest to the indicators for selectively delivering a voltage to a pair of these conductors in coincidence with one indicator in response to a signal from the receiver means to cause excitation of the nematic crystal material coincident with the selected electrical conductors. Upon excitation, the crystal material becomes opaque and as a result masks the indicator coincident therewith. Also, both indicators can be masked in order to give a fourth signal. In this case, both command signals would be transmitted to a signal indicating means to effect the masking.

In this latter embodiment, depending upon the signal received, any one or both of the indicators can be masked by the excited nematic liquid crystal material. The operation of this embodiment is similar to the above insofar as the programming of the command signals is concerned.

In order to facilitate viewing of the various indicating means, especially in darkness, various types of reflectors can be utilized either directly on the surface of the indicator elements or on transparent overlays positioned over the indicator elements.

The pacer system can be energized in a relatively simple and inexpensive manner by using a receiving means such as a radio receiver in each indicating means and by using a radio transmitter as the command signal transmitter means. Such a radio receiver can be powered, for example, by a solar cell or other suitable energy source which delivers energy to a storage battery. The receiver is programmed to respond to a received command signal from the transmitter means by emitting the command signal to the associated signal indicating means, for example, via a signal generator or actuator, to actuate each indicating means in the manner described above. The transmitter means may also include a simple signal generator for generating the command signal or signals to be sent by the transmitter means to the various receivers, for example, simultaneously. An adjustable time can also be connected to the transmitter means to vary the time intervals of the generated command signal or signals.

The invention further provides a method of spacing moving vehicles along a traffic lane of a roadway which comprises the steps of disposing a series of signal indicating means along the traffic lane in equally spaced apart relation to each other with each means having at least two indicators for selected visual display, and of emitting a command signal from a location remote from the series of signal indicating means to a receiver in each indicating means of the series. The command signal is emitted repeatedly to an individual indicating means at a predetermined time intervals for relatively short preset time durations to obtain an alternating visual display of the indicators in each signal indicating means. The command signals are also emitted in chronologically displaced sequence to the receivers of each of the series of signal indicating means to obtain a visual display of the pacer indicator at each signal indicating means in a continuous sequence which corresponds to the speed predetermined for a vehicle travelling along the traffic lane. In this way, successive continuous sequences of the pacing indicator can be obtained at the respective signal indicating means to enable immediately successive travelling vehicles to be paced at the predetermined speed while being spaced apart. This is also achieved where the command signal is transmitted to all of the signal indicating means simultaneously at spaced time intervals.

In addition to pacing and spacing vehicles in one traffic lane of a multi-lane highway at a first programmed speed, a second series of signal indicating means can be disposed along a second lane of the highway to pace and space the vehicles in this lane for a different speed. For example, a high speed lane can be programmed for 60 miles an hour while a slower inside lane can be programmed for 50 miles an hour or less. This programming can be done electronically by programming the emission of the command signals or by spacing the signal indicating means in each series at different spacings to have one signal activate one indicating means in each series.

In order to ensure against clustering of two or more vehicles travelling at the same speed for a given series or set of signal indicating means, the pacing indicator or signal is timed for relatively short durations. In addition, the respective signal indicating means can also be programmed so that should the indicating means turn from the pacing signal to a non-pacing signal while a second vehicle passes by, an alarm signal can be activated. Such an alarm signal can be a local type which emits an audible warning or of a type which activates an alarm at a remote station, such as a police station, to indicate a traffic infraction.

In addition, various monitoring means can be incorporated in the pacer system to monitor traffic conditions on a highway so that depending upon the traffic conditions, the transmitter means can be adjusted to slow down the pacing speed.

The signal indicating means can be mounted in any suitable housing affixed, for example, to a stanchion. Also, the indicating means can be sized with suitable dimensions so as to not unnecessarily distract a driver from driving along the roadway.

In summary, as a vehicle travels along the roadway following the pacer system, the driver of the vehicle would see the same indicator displayed upon passing each of the signal indicating means along the roadway provided the vehicle travels at the programmed pacing speed. Should the vehicle speed up or slow down from the pacing speed, the driver of the vehicle would not see the correct indicator or the correct indicator in the correct position. So long as the driver synchronizes the speed of his vehicle with the programmed speed for the pacing system, the pacing indicator will appear in the proper position at each indicating means. Further, as the pacing signals are repeatedly displayed at the indicating means in a programmed sequence upon the programmed speed, the next succeeding vehicle travelling along the pacer system can be maintained at a suitable distance from the vehicle in front.

These and other objects and advantages of the invention will become more apparent from the following detailed description and appended claims taken in conjunction with the accompanying drawings in which:

Figures 1, 6:
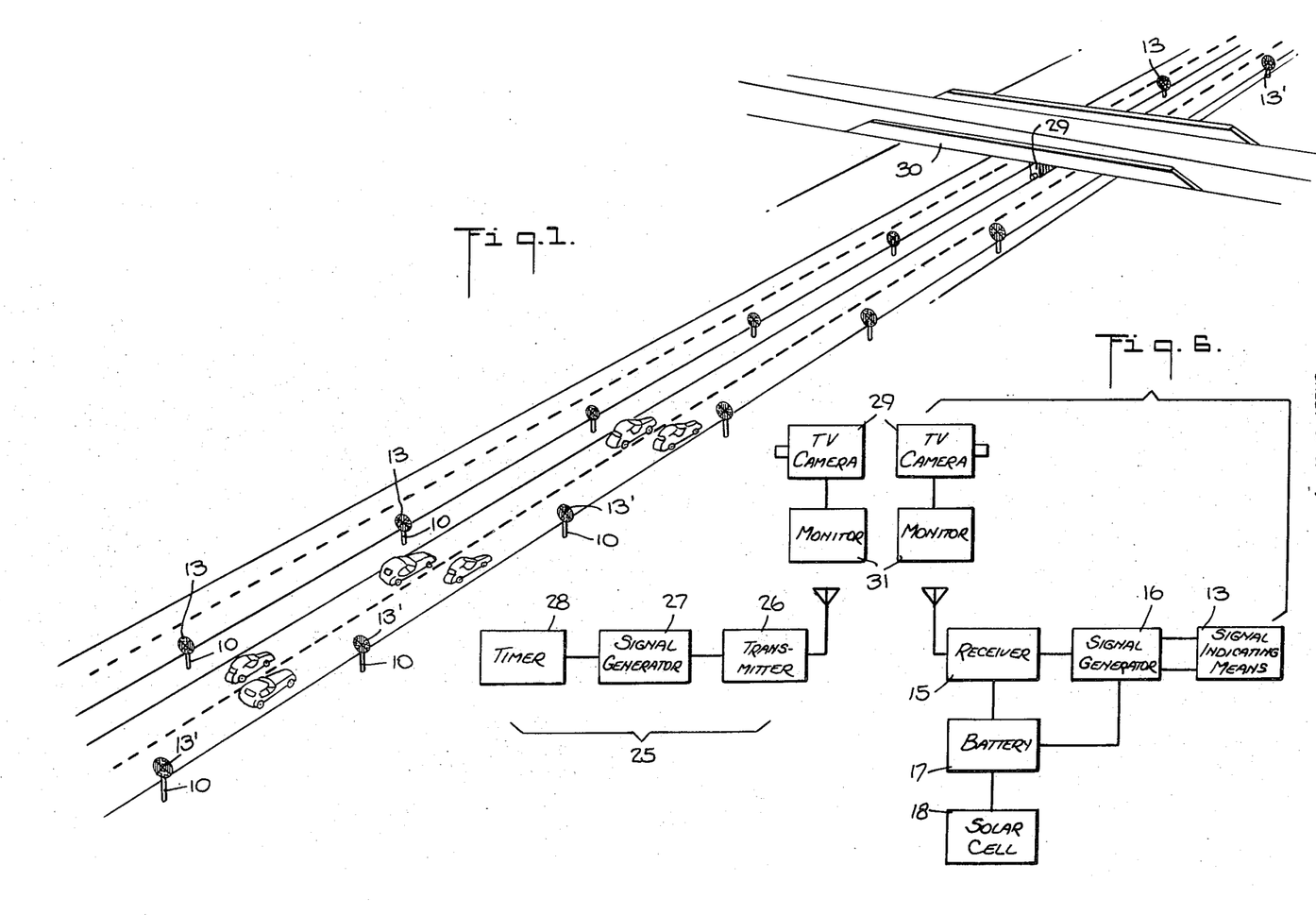
FIG. 1 illustrates a perspective view of a multi-lane roadway incorporating a pacer system thereon according to the invention.
FIG. 6 schematically illustrates an electronic circuit for the vehicle pacer system.

Referring to FIG. 1, a traffic pacer system uses a plurality of stanchions 10 which are disposed along the inner lane 11 and outer lane 12 of a multi-lane roadway to mount a signal indicating means 13 thereon. Each of these stanchions 10 is disposed in equally spaced apart relationship to the other, for example, a distance corresponding to a multiple of standard vehicle lengths for a given speed.

Figures 2, 3, 4, 5:
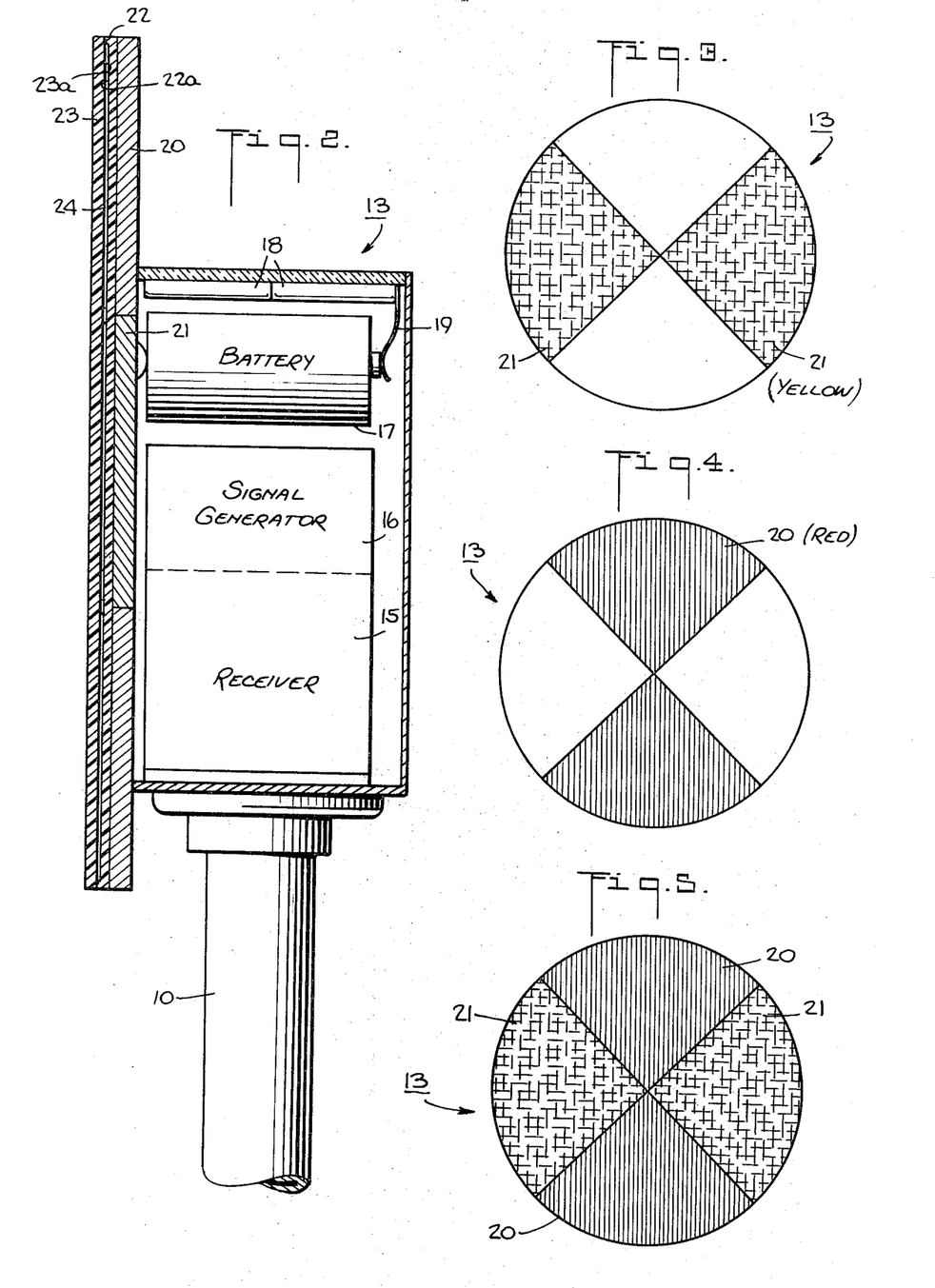
FIG. 2 illustrates one embodiment of a signal indicating means according to the invention.
FIG. 3 illustrates one indicator appearing on the indicating means of FIG. 2 according to the invention.
FIG. 4 illustrates a second indicator appearing on the signal indicating means of FIG. 2.
FIG. 5 illustrates a third indicator appearing on the signal indicating means of FIG. 2.

Referring to FIG. 2, each signal indicating means 13 includes a weathertight housing 14 mounted atop a stanchion 10 in any suitable manner. In addition, each indicating means 13 has a receiver means such as a radio receiver 15 and a signal generator or amplifier 16 mounted within a common unit in the housing 14 along with an energy souce, for example, composed of one or more batteries 17 and one or more solar cells 18. As shown, the solar cells 18 are electrically connected by a suitable line 19 to the battery 17 to deliver energy for storage purposes to the battery 17. The battery 17 is, in turn, electrically connected in a manner not shown to the radio receiver 15 and the signal generator 16 to actuate the same.

Each signal indicating means 13 also includes two indicators 20, 21 which may be in the form of reflectors, which are mounted on the front of the housing 13 in a direction facing the traffic flow. As shown in FIG. 5, the indicators 20, 21 are of quadrant shape with two such indicators disposed in symmetrical opposition to the other being of the identical color, for example, red. The remaining two quadrant-shaped indicators are of different color, such as, yellow. These indicators are positioned to form a disc-like appearance on the front of the housing 13. In addition, a pair of transparent plastic or glass sheets 22, 23 are disposed over and in front of the indicators 20, 21 while a thin film layer 24 of nematic liquid crystal material is sandwiched between the two sheets 22, 23. The sheet 22 closest the indicators 20, 21 is coated with a transparent electrically conductive surface 22a as is known each of which is disposed within a quadrant of the sheet 22 coincident with a respective quadrant of an indicator 20, 21. The sheet 23 remote from the indicators 20, 21 is provided with a single transparent electrically conductive surface 23a which is coincident with all the quadrants of the indicators 20, 21 to act as a common ground. The respective conductive surfaces 22a, 23a are electrically connected to the signal generator 16 in a suitable manner.

Referring to FIG. 6, the solar cells 18 are connected by the line 19 to the batteries 17 to deliver energy thereto for storage. The battery 17, in turn, is connected to the receiver 15 and to the signal generator 16 to supply power to each. The receiver 15 is also adapted to receive command signals from a suitable source, for example, by radio control. When receiving a specific "odd" command signal, the receiver 15 emits such to the signal generator 16. The signal generator 16, in turn, is turned on to generate a voltage of approximately 15 volts and between 50 and 500 cycles that is applied to the layer 24 of liquid crystals (FIG. 2) in front of the red indicators 20. The liquid crystals when excited become reflective and thereby screen out or mask the red indicators 20. As a result, only the yellow indicators 21 appear to view as shown in FIG. 3. Should the receiver 15 receive an "even" command signal, the signal generator 16 is turned onto deliver the voltage to the liquid crystals in front of the yellow indicators 21. In this manner, the "even" command signal masks the yellow indicators 20. Should both signals be received, the signal generator 16 excites the entire layer of liquid crystals so that all of the reflectors 20, 21 are masked. This total masking of the two indicators 20, 21 can also, of itself, be used as a signal.

Referring to FIG. 6, in order to emit suitable command signals to the receiver 15 of the various signal indicating means 13, a suitable signal producing means 25 is provided at a location remote from the series of signal indicating means 13. The signal producing means 25 is in the form, e.g. of a transmitter means, such as a radio transmitter 26, a signal generator 27 for generating a predetermined set of command signals in a programmed sequence and an adjustable timer 28. For example, the signal generator 27 is programmed to generate "odd" and "even" command signals at predetermined time intervals with each command signal emitted for a suitable preset duration. The command signals are then transmitted to the radio transmitter 26 for emission to the respective receiver 15. The adjustable timer 28 is provided for the signal generator 27 to adjust the time intervals for the emission of the command signals from the signal generator 27. Alternatively, separate transmitters can be used to emit the respective command signals.

The pacer system can also utilize various monitoring means such as television monitoring means for monitoring the actual traffic conditions at certain points along the roadway. For example, as shown in FIG. 1, a television camera 29 can be located at an overpass 30 to inspect the lanes 11, 12 of traffic in one direction with a similar camera on the other side of the overpass to monitor the traffic flowing in the opposite direction. As shown in FIG. 6, this camera 29 can be connected as is known to various monitors 31 at the remote location in which the transmitter 26 is located. In this way, depending upon the traffic conditions, the signal generator 27 can be manipulated to deliver command signals for pacing the traffic at speeds compatible with the traffic conditions.

In order to describe the operation of the pacer system, reference will be made to the pacing of vehicles in the outer lane 12 (FIG. 1) of the roadway at a speed ($v$) of 60 miles per hour, that is at 88 feet per second, with a spacing ($s$) between vehicles of six vehicle lengths. Assuming a vehicle length is 20 feet, the spacing between successive vehicles will be 120 feet at the speed while the center-to-center spacing of the vehicles will be 140 feet. Thus, the stanchions 10 are spaced 140 feet apart.

Referring to FIGS. 1 and 6, the signal generator 27 for the signal producing means 25 is programmed to emit an "odd" command signal at intervals ($t$) of 1.59 seconds, i.e., 140 feet divided by 88 feet per second — $t = s/v$. This command signal can be generated for a duration of time which is a fraction of the interval, for example, for 0.2 to 0.5 seconds. The transmitter 26 will then transmit this "odd" command signal to the receiver 15 of one signal indicating means 13 to cause masking of the red indicator while permitting viewing of the yellow indicator 21 as a pacing signal as shown in FIG. 3. In addition, the signal producing means 25 is programmed so that the "odd" command signal is again emitted for delivery to the next signal indicating means 13 in the series at a later time equivalent to the time it takes the vehicle travelling at 60 miles an hour to reach the next stanchion 10. For example, where the stanchions are placed 140 feet apart, the time for the vehicle to traverse the distance would require 1.59 seconds. Thus, the "odd" command signal is emitted 1.59 seconds later to the next stanchion, i.e., at time ($t$) = 3.18 seconds. It can be seen that the signal generator 27 will require programming such that a series of signals can be transmitted to a given signal indicating means at times of 1.59 seconds, 3.18 seconds, 4.77 seconds, and multiples of 1.59 seconds while also emitting signals to the next successive stanchion at multiples of 1.59 seconds.

Thus, one signal can be transmitted every 1.59 seconds to energize all of the signal indicating means of a series. A plurality of transmitters can also be used to energize groups of the signal indicating means along a roadway.

With respect to the series of indicating means 13 for the inside lane 11, such can be programmed to maintain a spacing at 50 miles an hour of five vehicle lengths. This will require the "odd" command signal to be emitted at intervals of 1.64 seconds to the stanchions 10' which are spaced 120 feet apart (i.e., the desired spacing at 50 M.P.H.). The programming of the signals from the signal generator 27 for this series of signal indicating means will be computed in similar manner as above.

In the event that the speed of the vehicles is to be lowered for given traffic conditions, for example, to 40 miles per hour, the spacing between the generator of the "odd" signals will be 1.71 seconds and for 30 miles an hour, 1.82 seconds. The times are arrived at by dividing the required distance ($s$) in feet from center-to-center of the vehicles by the speed ($v$) in feet per second (fps). In other words, the clear distance ($s$) maintained between vehicles will be equal to the product of the vehicle speed ($v$) times the time interval ($t$) less the length of the vehicle. Should it be convenient to program a repeating signal at other time intervals, such as at intervals of 2 seconds, while maintaining a relationship of one vehicle per stanchion, the spacing will change between the vehicles. For example, for a 2 second interval, the spacing between stanchions and between the vehicles at 60 miles per hour, assuming a length of vehicle of 20 feet, will be 156 feet and at 50 miles an hour would be 127 feet.

Should a given series of stanchions require different spacings due to road design, e.g. a spacing 60 M.P.H. for a straight section and 45 M.P.H. for a curved section, the stanchions 10 would be spaced at intervals of 140 feet in the straight section and 110 feet (4.5 car lengths + one car length) in the curved section. The command signal would be sent at intervals of 1.59 seconds, as noted above, to the stanchions in the straight section and at intervals of 1.83 seconds to the stanchions in the curved section.

The signal generator 27 is also programmed to deliver an "even" command signal to the various indicating means 13 to mask the yellow indicators while leaving the red indicators 20 exposed to view. The exposure of the red indicators 20 can be used as a second pacing signal for a second vehicle or can be used to indicate that a vehicle has fallen out of synchronism or pace with the yellow pacing signals. When the red indicators 20 are also used to pace a vehicle, the signal generator 27 can be programmed, as above, so that "odd" and "even" command signals are produced in alternating manner for each signal indicating means.

When both command signals are sent to a receiver 15, the signal generator 16 connected therewith sends a voltage to all of the conductors in the sheet 22 (FIG. 2) to cause masking of all the indicators 20, 21. Thus, no pacing signal would be produced. By suitable activation and deactivation of the signal generator 16 by a further signal from the transmitter 26, a flashing appearance of all the reflectors 20, 21 or none can be achieved to possibly indicate a warning signal for traffic to slow or to use extreme caution due to some traffic problem ahead. This warning signal can be superimposed over the "odd" and "even" command signals in any suitable fashion.

Figure 7:
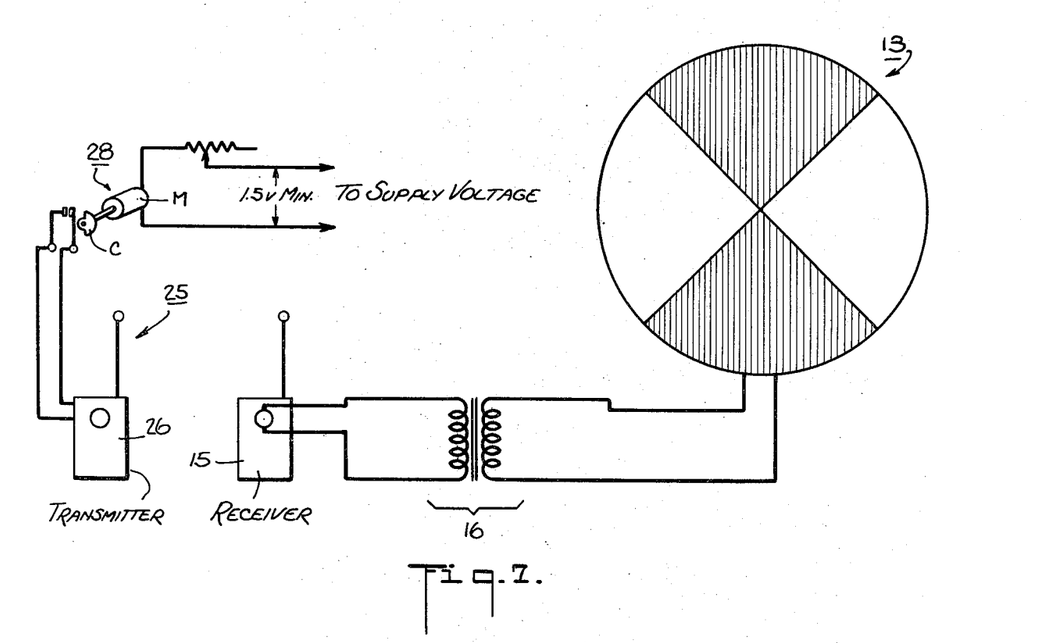
FIG. 7 illustrates a circuit diagram for a vehicle pacer system utilizing the indicating means of FIG. 2.

Referring to FIG. 7, wherein a circuit diagram of one embodiment of the transmitter means and receiving means is shown with like reference characters indicating like parts as above, since the liquid crystal indicating means uses two separate and distinct signals, duplicate systems are used, one for an "odd" signal of one frequency and the other for an "even" signal of a second frequency. As shown, each transmitter 26 and receiver 15 is formed, for example, by respective transmitter and receiver sections of a Fanon Electronics model FCB 303 "Walkie Talkie". The signal generator in the transmitter 26 is made by connecting the output of the receiver section to the input of the transmitter section in such a manner that the transmitter operates regeneratively and transmits a "whistle" type signal whenever the transmitter is in a transmit mode and is turned on. The transmitter 26 is permanently conditioned to the transmit mode and is turned on and off at even intervals by a switch S operated by a 180° motor operated cam C of a timer 28. The motor M operates off a battery as shown. The receiver 15 has an output connected to a transformer, such as a simple 100:1 ratio transformer, which acts as the signal generator or amplifier 16 which, in turn, is connected to the conductors in the sheet 22 to excite the nematic liquid crystal material in front of one of the indicators 20.

Figures 8, 9, 10, 11:
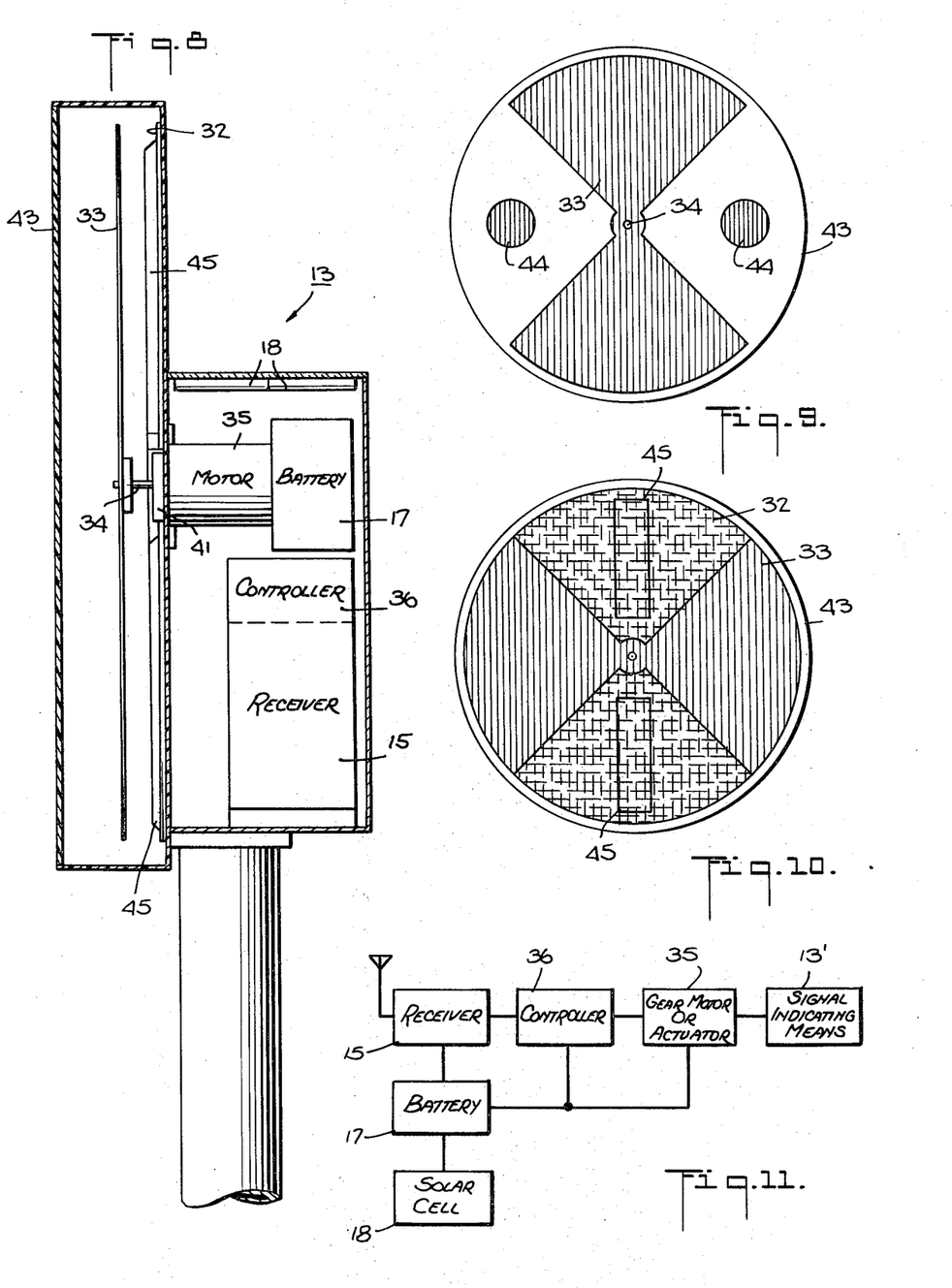
FIG. 8 illustrates a second embodiment of a signal indicating means according to the invention.
FIG. 9 illustrates one indicator displayed by the indicating means of FIG. 8.
FIG. 10 illustrates a second indicator displayed by the indicating means of FIG. 8.
FIG. 11 schematically illustrates an electronic circuit diagram for the indicating means of FIG. 8.

Referring to FIG. 8, wherein like reference characters indicate like parts as above, in another embodiment of the signal indicating means 13', use can be made of mechanical types of indicators. As shown, a first indicator 32, substantially of hour-glass shaped configuration is mounted in stationary fashion in front of the housing 13 while a second indicator 33 of similar configuration is rotatably mounted coaxially in front of the first indicator 32. As shown, the second indicator 33 is mounted on a shaft 34 which is rotatably mounted within a gear motor or actuator 35. The gear motor 35 is, in turn, connected to a controller 36 which, in turn, is connected to a receiver 15. The motor 35, controller 36 and receiver 15 are each connected to an energy source made up of a battery 17 and a solar cell 18.

Figure 12:
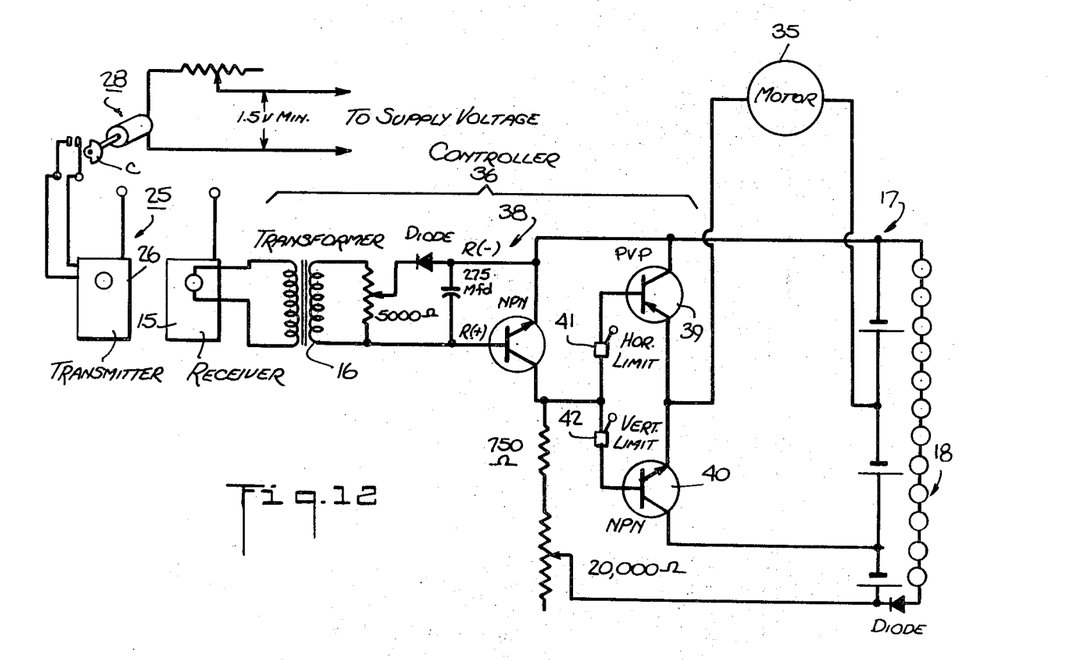
FIG. 12 illustrates a circuit diagram for a system utilizing the indicating means of FIG. 8.

Referring to FIGS. 9 and 12, the receiver 15 is adapted to receive a signal from a transmitter 26, as shown in FIG. 12, and to emit the signal to the controller 36. The controller 36, which is constructed as shown in FIG. 12 to include a transformer 16 and a control circuit 38, transforms the received signal into a command signal which is delivered to the motor 35. The control circuit 38 attenuates and rectifies the output from the transformer 16 in order to obtain a useable signal that can act as a proper bias on the transistors 39, 40 of the circuit 38. The motor 35 is thus actuated to rotate the rotatable indicator 33 (FIG. 7) through a 90° angle from one position to another.

In order to stop the indicator 33 in proper position, limit switches 41, 42 are provided on the housing 13, only one of which is shown in FIG. 8, in the path of the indicator 33. These switches 41, 42 as shown in FIG. 12, serve to terminate the emission of the command signal to the motor 35. In addition, one switch 41 acts as a horizontal limit switch to shut off the motor 35 when the indicator 33 reaches a horizontal position while the other switch 42 acts as a vertical limit switch to shut off the motor 35 when the indicator 33 reaches the vertical position. The switches 41, 42 also serve to reflect the position of the indicator 33 for the control circuit 38 and are connected to the input circuits of transistors 39, 40 that drive the gear motor 35 so that the motor 38 is driven in either a forward or reverse direction. That is, the switches 41, 42 prevent the delivery of the same command signal twice in succession to the motor 35.

As shown in FIG. 9, in one position, the rotatable indicator 32 which may be of a red color is positioned in alignment over the stationary indicator 32 which may be of yellow color to mask the stationary indicator 32. After activation of the motor 35, the rotatable indicator 33 is rotated into the position as shown in FIG. 10. In this latter position, both the indicators 32, 33 are exposed to view.

Referring to FIG. 8, the indicators 32, 33 are enclosed within a weathertight clear plastic enclosure 43 secured to the housing 13. As shown, the stationary indicator 32 can be fixed to the rear wall of the enclosure 43. Further, suitable reflectors to facilitate viewing of the indicators in darkness can be used. For example, as shown in FIG. 9, circular discs 44 of reflective material can be disposed in a common horizontal plane for viewing when the rotatable indicator 33 is in the masking position over the stationary indicator 32. These disc-like reflectors 44 are of the same basic color as the rotatable indicator 33 and can be mounted on the rear wall of the enclosure 43. Also, as shown in FIG. 10, the stationary indicator 32 is directly provided with two elongated vertically disposed reflectors 45 of similar basic color.

In use, should an "odd" command signal be received from a transmitter as shown in FIG. 6 by the receiver 15, the second indicator 33 is moved into the position shown in FIG. 9 to mask the yellow indicator 32. Thus, only a red indicator pacing signal is displayed. Upon receiving an "even" signal from the transmitter, the receiver 15 and controller 36 causes the motor 35 to rotate the red indicator 33 into a horizontal disposition as shown in FIG. 10 exposing the yellow indicator 32. Thus, a signal is displayed with both the red and yellow indicators shown.

In the above described embodiment, the programming of the signal producing means to emit the command signal from the transmitter 26 can be carried out in various ways. For example, as described above, for a given speed such as 60 miles an hour, the timing intervals between command signals, that is from the start of one command signal to the start of the second command signal, and so on, is determined by dividing the desired speed in feet per second into the distance desired from center-to-center of two consecutive vehicles. By subtracting the length of a vehicle from this distance, the spacing between vehicles can be obtained. For example, assuming a car to be of a length of 20 feet and assuming that a desired spacing at the speed is six car lengths, the center-to-center distance between the cars amounts to 140 feet. Thus, the time interval for the command signals is approximately 1.59 seconds.

Alternatively, the placement of the various signal indicating means 13 can be chosen other than for a one to one ratio. In this case, the set of command signals to be emitted to successive indicating means 13 can be conveniently timed in the command signal generator. For example, where the individual signal indicating means are spaced at multiples of the above-mentioned spacing for a one to one ratio of stanchion to car, e.g. a 560 feet apart for a vehicle travelling at 60 miles per hour, the vehicle would require about 6.36 seconds to pass from one indicating means to the next. Thus, the initiation of a pacing signal at the next indicating means would be delayed by 6.36 seconds relative to the pacing signal at the previous indicating means.

Starting from time $t = 0$, the transmitter would emit command signals to a first indicating means at 1.59 seconds, 3.18 seconds, 4.77 seconds, 6.36 seconds, etc. while also emitting command signals to the next indicator means at times 7.95 seconds, 10.44 seconds, 11.13 seconds, 12.72 seconds, etc. The remaining indicating means would receive command signals on a similar programmed basis.

In another manner, the timing of the command signals can be spaced 2 seconds apart from the start of one signal to the start of the next signal. In this case, at 60 miles per hour the spacing apart of the stanchions and vehicles would be 176 feet from center-to-center. Using this method, the command signals would be generated for each individual indicating means at 2 second intervals while the chronological delay from one set of signals or one indicating means to the other would again be 2 seconds. Thus, the signal generator can be programmed in terms of whole numbers rather than in fractions.

In the case where the signal indicating means is to display either a pacing signal or a non-pacing signal within a given time interval, the time duration of the pacing signal can be kept to a minimum to preclude two vehicles from following the same pacing signal. For example, the pacing signal can be displayed for a fraction of a second, for example, from 0.2 to 0.5 seconds.

As shown in FIG. 1, both lanes 11, 12 of a multi-lane highway can be provided with individual pacing systems. Furthermore, the outermost lane can be provided with a pacing system to achieve the pacing of vehicles at 60 miles per hour while the innermost lane is provided with a system to achieve pacing at a lesser speed, for example, 50 miles per hour. The operation of each system would be similar to that as described above. In addition, instead of using separate transmitters and signal generators for emitting command signals to the two pacer systems, a single transmitter with a single generator can be used. In such a case, the signal generator would be programmed to emit the proper signals to the signal indicating means of each pacer system at the appropriate time. This can be done in any suitable fashion.

It is noted that a direct connection between the transmitting means and the receiving means is not required. As a result, the cost of installation of the pacer system can be reduced.

Although the various indicating means are shown as being mounted on stanchions at spaced apart points along a roadway, any suitable mounting means can be used to position the indicating means along the roadway. Furthermore, the various indicating means can be suitably dimensioned to provide as little as possible a distraction from a driver's attention to the roadway while driving.

It is finally noted that various other types of pacing signals can be displayed other than those specifically described above. For example, a flashing light can be used to indicate the pacing signal at each indicating means. Furthermore, the various signal indicating means can be incorporated with mileage posts which are common along many highways so that a separate stanchion or other support is not required.

It is further noted that the command signals emitted by the transmitting means can be of any suitable nature containing an identity code to indicate to which signal indicating means the signal is to be sent as well as a code containing the particular information or command to be given to the signal generator or actuator of the signal indicating means for display of a given indicator. Similarly, each receiving means can be programmed to receive only those command signals having a particular identity code for that particular receiving means. Such transmitting-receiving systems are well known, for example, as described in U.S. Pat. Nos. 2,559,622 and 2,554,329.

The traffic pacer system can be used for relatively long stretches of a roadway or over relatively short road lengths, for example, along a construction site roadway in order to pace various types of construction or other vehicles. In some instances, the pacer system can be used alongside a roadway where repairs or other type of road work is under way. In these cases, the vehicular traffic passing by the site of the road work can be positively paced at speeds which are considered safe for the personnel working at the site.

What is claimed is:

1. In a vehicle pacer system for spacing immediately successive vehicles apart in a traffic lane of a roadway,
    a series of signal indicating means disposed along the traffic lane in equal spacings relative to each other, said spaceing ($s$) corresponding to a distance equal to a multiple of vehicle length for a given speed ($v$) and each means having at least two indicators for visual display and a radio receiver for receiving a first signal to visually display one of said indicators and for permitting visual display of another of said indicators in response to an absence of said first signal; and
    a radio transmitter remotely located with respect to said series of signal indicating means for emitting said signal simultaneously to said radio receiver of each signal indicating means repeatedly at time intervals ($t$) to obtain an alternating visual display of said indicators in each signal indicating means and to obtain a visual display of said one indicator at each successive signal indicating means in a continuous corresponding to said given speed for a vehicle travelling along the traffic lane, said time intervals ($t$) being determined by dividing said spacing ($s$) in feet by said given speed ($v$) in feet per second, whereby successive continuous sequences of visual display of said one indicator by said series of signal indicating means enables immediately successively travelling vehicles to be spaced apart in the traffic lane at said spacing ($s$) of said signal indicating means.

2. A vehicle pacer system as set forth in claim 1 wherein each signal indicating means includes a first element mounted in a stationary position and a second element mounted to move between a first position aligned with said first element to permit visual viewing of only one of said elements as said one indicator, and a second position out of alignment with said first element to permit visual viewing of both elements as said another indicator.

3. A vehicle pacer system as set forth in claim 2 wherein said second element is pivotally mounted relative to said first element to mask said first element in said first position.

4. A vehicle pacer system as set forth in claim 2 wherein each element is an hour-glass shaped segment.

5. A vehicle pacer system as set forth in claim 2 wherein said signal indicating means includes reflectors to facilitate viewing of said elements in each said position.

6. A vehicle pacer system for spacing immediately successive vehicles apart in a traffic lane of a roadway, comprising
   a series of signal indicating means disposed along the traffic lane in predetermined equally spaced apart relation to each other, each means having two indicators for selective visual display, a radio receiver means electrically connected to said indicators for selecting one of said indicators for visual display in response to a first signal, for selecting the other of said indicators for visual display in response to a second signal and for selecting both said indicators for visual display in response to both said signals; and
   a radio transmitting means remotely located with respect to said series of signal indicating means for simultaneously emitting said signals to each said receiver means at predetermined time intervals to obtain a visual display of said indicators in alternating manner in each signal indicating means and to obtain a visual display of said one indicator at each successive signal indicating means in a continuous sequence corresponding to a predetermined speed for a vehicle travelling along the roadway, whereby successive continuous sequences of said one indicator in said series of signal indicating means enables successively travelling vehicles to be spaced apart on the roadway at said predetermined speed.

7. A vehicle pacer system as set forth in claim 6 wherein said indicators of each signal indicating means are geometrically displaced from each other and wherein each signal indicating means includes a masking means positioned over said indicators to mask at least one said indicators from view.

8. A vehicle pacer system as set forth in claim 6 wherein said two indicators of each signal indicating means are geometrically spaced indicators of different colors disposed in a common vertical plane.

9. A vehicle pacer system as set forth in claim 8 wherein each signal indicating means further includes a pair of transparent sheets in front of and coincident with said indicators, a film layer of nematic liquid crystal material sandwiched between said sheets, a transparent electrical conductor disposed in said sheet remote from said indicators and transparent electrical conductors disposed in said sheet closest said indicators each oriented in coincidence with only one of said indicators, and a signal generator electrically connected to said latter electrical conductors and electrically connected to said receiver means for selectively delivering a voltage to said latter electrical conductors in response to said signals from said receiver means to cause excitation of said nematic crystal material coincident with a selected electrical conductor and masking of a coincident indicator.

10. A vehicle pacer system as set forth in claim 9 wherein each said indicator includes a pair of quadrant-shaped indicators of identical color disposed in symmetrical opposition to each other.

11. A vehicle pacer system as set forth in claim 6 wherein each signal indicating means includes a housing having said indicators and said receiver means mounted therein, at least one solar cell for generating electricity within said housing, at least one battery connected to said solar cell for storing the generated electricity and to said receiver for actuating said receiver, and a signal generator within said housing connected to said receiver means and said battery to receive said signals from said receiver means and connected to said indicators for displaying at least one said indicators in response to said signals.

12. A vehicle pacer system as set forth in claim 6 which includes a signal generator connected to said transmitting means to deliver said signals thereto and an adjustable timer connected to said signal generator for varying said time intervals.

13. A vehicle pacer system as set forth in claim 6 wherein said roadway has tow lanes for traffic and wherein two series of said signal indicating means are positioned along said roadway with each said series being positioned along a different said lane.

14. A vehicle pacer system for a roadway comprising
   a series of signal indicating means disposed along the roadway in equal spacings relative to each other, said spacings corresponding to a distance equal to a multiple of standard vehicle length for a given speed, each signal indicating means having at least two indicators for visual display, a radio signal receiving means electrically connected to said indicators for selecting one of said indicators for visual display in response to a first signal and for selecting another of said indicators for visual display in response to an absence of said first signal; and
   radio transmitting means remotely located with respect to said series of signal indicating means for repeatedly communicating said first signal simultaneously to a plurality of said signal receiving means at predetermined time intervals for thereby enabling a sequential visual display of said indicators in an alternating manner in individual signal indicating means and to obtain a visual display of said one indicator at each successive signal indicating means in a continuous sequence corresponding to said given speed, whereby successive continuous sequences of said one indicator at said signal indicating means enables successive travelling vehicles on the roadway to be paced at said given speed and to be spaced apart on the roadway at a distance corresponding to said spacing.

15. A vehicle pacer system for a roadway comprising a series of signal indicating means disposed along the roadway at equal spacings relative to each other, said spacings corresponding to a multiple of a distance equal to a multiple of standard vehicle lengths for a given speed, each signal indicating means having at least two indicators for selective visual display, a radio signal receiving means electrically connected to said indicators for selecting one of said indicators for visual display in response to a first signal and for selecting another of said indicators for visual display in response to an absence of said first signal; and radio transmitting means remotely located with respect to said series of signal indicating means for repeatedly transmitting said first signal simultaneously to a plurality of said signal receiving means at predetermined time intervals and for preset time periods and for thereby enabling a sequential visual display of said indicators in an alternating manner in individual signal indicating means and to obtain a visual display of said one indicator at each successive signal indicating means in a continuous sequence corresponding to said given speed whereby successive continuous sequences of said one indicator at said signal indicating means enables successively travelling vehicles on the roadway to be paced at said given speed and to be spaced apart on the roadway a distance substantially equal to said distance.

16. A method of spacing moving vehicles along a traffic lane of a roadway comprising the steps of disposing a series of signal indicating means along the traffic lane in equal spacings relative to each other, each said spacing corresponding to a distance equal to a multiple of standard vehicle length for a given speed and each means having a radio receiver and at least two indicators for selective visual display with one of said indicators being adapted for visual display in response to reception of a first signal in said radio receiver and another of said indicators being adapted for visual display in response to an absence of said first signal in said radio receiver; and emitting said signal from a location remote from the series of signal indicating means to said radio receiver of each signal indicating means simultaneously at predetermined time intervals for relatively short preset time durations to obtain an alternating sequential visual display of the indicators in each signal indicating means while also obtaining a visual display of the one indicator at each successive signal indicating means in a continuous sequence corresponding to said given speed for a vehicle travelling along the traffic lane, whereby successive continuous sequences of a visual display of the one indicator at the signal indicating means enables immediately successive travelling vehicles to be spaced apart in the traffic lane at said spacing.

17. A signal indicating means for a vehicle pacer system having at least two indicators for visual display, said indicators being of different colors and geometrically displaced from each other in a common vertical plane, a receiver for visually displaying one of said indicators in response to a first signal and for permittting visual display of another of said indicators in response to an absence of said first signal, a pair of transparent sheets in front of and coincident with said indicators, a film layer of nematic liquid crystal material sandwiched between said sheets, a transparent electrical conductor disposed in said sheet remote from said indicators and transparent electrical conductors disposed in said sheet closest said indicators each oriented in coincidence with only one of said indicators, and a signal generator electrically connected to said latter electrical conductors and electrically connected to said receiver for selectively delivering a voltage to said latter electrical conductors in response to said signals from said receiver to cause excitation of said nematic crystal material coincident with a selected electrical conductor and masking of a coincident indicator.

* * * * *

UNITED STATES PATENT OFFICE
CERTIFICATE OF CORRECTION

PATENT NO. : 3,872,423
DATED : March 18, 1975
INVENTOR(S) : John Yeakley

It is certified that error appears in the above-identified patent and that said Letters Patent are hereby corrected as shown below:

Column 1, line 53, "that" should be --than--.
Column 2, line 64, before "(60)" insert --sixty--.
Column 4, line 22, "time" should be --timer-- .
Column 4, line 59, before "(60)" insert --sixty--.
Column 4, line 60, before "(60)" insert --fifty--.
Column 12, line 42, "spaceing(s)" should be --spacing(s)--.
Column 12, line 58, before "corresponding" insert --sequence--.
Column 14, line 30, "tow" should be --two--.

Signed and sealed this 24th day of June 1975.

(SEAL)
Attest:

RUTH C. MASON
Attesting Officer

C. MARSHALL DANN
Commissioner of Patents
and Trademarks